No. 888,650.

PATENTED MAY 26, 1908.

H. PETERSEN.
LINOTYPE MACHINE.
APPLICATION FILED SEPT. 16, 1907.

Witnesses:
L. L. Simpson
A. H. Opsahl

Inventor:
Hans Petersen
By his Attorneys:
Williamson Merchant

No. 888,650. PATENTED MAY 26, 1908.
H. PETERSEN.
LINOTYPE MACHINE.
APPLICATION FILED SEPT. 16, 1907.

Witnesses:
L. L. Simpson
A. H. Opsahl

Inventor:
Hans Petersen
By his Attorneys:
William Merchant

No. 888,650. PATENTED MAY 26, 1908.
H. PETERSEN.
LINOTYPE MACHINE.
APPLICATION FILED SEPT. 16, 1907.

Witnesses:
L. L. Simpson
A. H. Opsahl

Fig. 9

Inventor:
Hans Petersen
By his Attorneys
William Murchant

No. 888,650.

PATENTED MAY 26, 1908.

H. PETERSEN.
LINOTYPE MACHINE.
APPLICATION FILED SEPT. 16, 1907.

Witnesses:
L. L. Simpson
A. H. Opsahl.

Inventor:
Hans Petersen
By his Attorneys
Williamson Merchant

No. 888,650. PATENTED MAY 26, 1908.
H. PETERSEN.
LINOTYPE MACHINE.
APPLICATION FILED SEPT. 16, 1907.

No. 888,650. PATENTED MAY 26, 1908.
H. PETERSEN.
LINOTYPE MACHINE.
APPLICATION FILED SEPT. 16, 1907.

Witnesses:
L. L. Simpson
A. H. Opsahl

Inventor:
Hans Petersen
By his Attorneys:
Williamson Merchant

UNITED STATES PATENT OFFICE.

HANS PETERSEN, OF MINNEAPOLIS, MINNESOTA.

LINOTYPE-MACHINE.

No. 888,650.  Specification of Letters Patent.  Patented May 26, 1908.

Application filed September 16, 1907. Serial No. 393,025.

*To all whom it may concern:*

Be it known that I, HANS PETERSEN, a citizen of the United States, residing at Minneapolis, in the county of Hennepin and State of Minnesota, have invented certain new and useful Improvements in Linotype-Machines; and I do hereby declare the following to be a full, clear, and exact description of the invention, such as will enable others skilled in the art to which it appertains to make and use the same.

This invention relates to so-called linotype machines, wherein the matrices are released, one at a time, from a magazine by means of escapement devices, and are delivered through guide channels to the casting mechanism, where the linotype or slug is cast from the assembled line of matrices, and the matrices are subsequently returned to the magazine by so-called distributing mechanism.

The invention is particularly directed to the improvement of the distributing mechanism, whereby some matrices, such, for instance, as those bearing the same letters or characters of different styles or face, may be selected and delivered into different magazine channels.

The invention further also involves a novel form of escapement mechanism, and also certain other novel devices which coöperate with the distributing and escapement mechanism.

In the drawings which illustrate the several features of this invention, like characters indicate like parts throughout the several views.

Referring to the drawings.

As already stated, the several features of my invention are shown as applied to a linotype machine of commercial form. Of the parts shown of this machine, the numeral 1 indicates the distributing bar or rail which is supported in the usual way from a frame 2 through suitable connecting brackets 3. The distributing screws 4, 5 and 6, except as hereinafter described, are of the usual construction and arrangement and are suitably mounted in the frame 2. The matrices z are guided by and arranged to be dropped from the grooved lower edge of the distributing bar 1 in the usual way.

The matrix magazine 7 is provided with laterally spaced closely positioned matrix channels 8, which channels are arranged in pairs with the members of the pairs of channels adjacent to each other and alined with coöperating relatively wide channels 9 of the magazine throat or entrance 10 (see particularly Figs. 1, 6, 7, 11 and 12). This magazine throat or entrance 10 extends on a curved line upward from the receiving ends of the magazine channels and terminates directly below the distributing bar 1, in position to receive the matrices z dropped from said bar. The grooves in the lower edge of the distributing bar 1 must, of course, be arranged to drop the proper matrices into the proper throat channels. In this manner, two separate fonts of type matrices may be distributed into one magazine without increasing its width beyond the present extreme size, or in the case of the larger sizes of type, by increasing the magazines slightly. It will, of course, be understood that this duplex arrangement of the magazine channels need not be incorporated throughout the whole magazine. This duplex arrangement of magazine channels and coöperating devices makes possible the use of a magazine of approximately one-half the length that would otherwise be required to handle matrices bearing frequently used letters or characters, such, for instance, as the lower case letters e, t, a, o, i, n and s. Hence, to illustrate, all matrices bearing the lower case e should be dropped into the same throat channel 9, and the matrices dropped in succession into said throat channel should be alternately delivered into the two coöperating magazine channels 8, which action is accomplished by a novel switch mechanism presently to be described.

Figures 1, 2, 3:
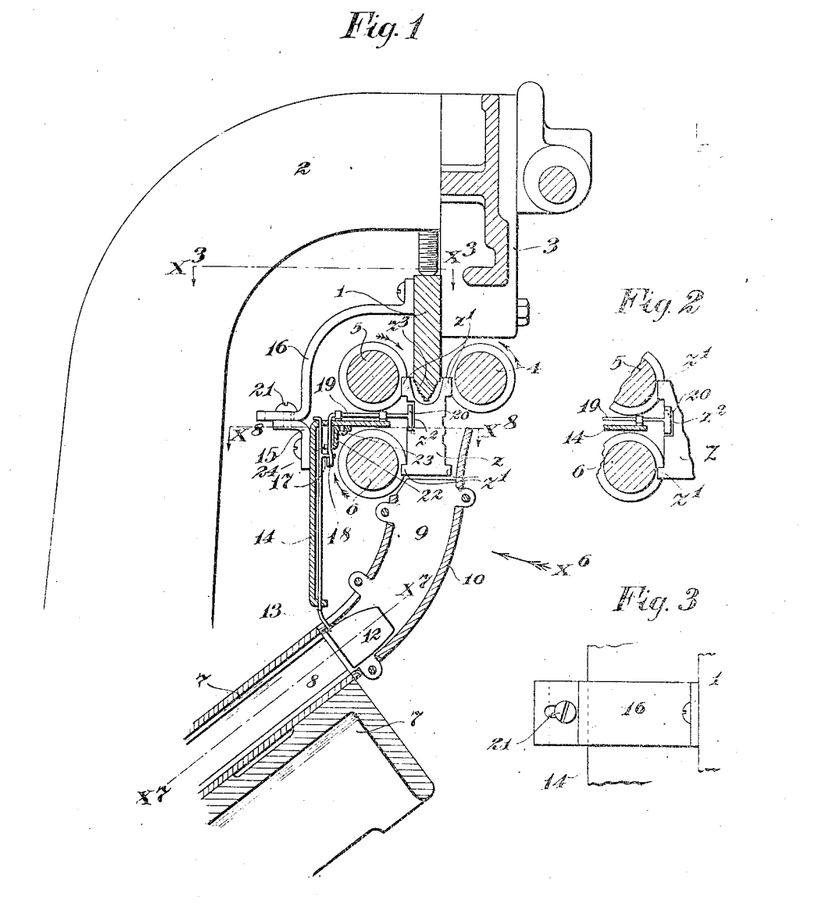
Figure 1 is a view in transverse vertical section with some parts broken away and some parts sectioned on the line $x^1 x^1$ of Fig. 4, illustrating the improved distributing mechanism applied to a linotype machine, such as is now in extensive use.
Fig. 2 is a fragmentary detail taken on the same line as Fig. 1, but illustrating a different action of the matrix than that illustrated in Fig. 1.
Fig. 3 is a detail in plan, with parts broken away, showing parts that lie immediately below the line marked $x^3 x^3$ on Fig. 1.

The distributing screws 4, 5 and 6, by the usual means (not shown) should be driven in the direction of the arrows marked thereon in Fig. 1, and it will, of course, be understood that the threads of these screws engage the projecting lips $z^1$ of the matrices $z$ and feed the same laterally until they come to positions over the proper throat channels 9 where they are dropped from the distributing bar and permitted to fall by gravity into the respective throat channels. As one of the minor but important features of this invention, the threads of these feed screws 4, 5 and 6 are formed with straight portions 11. These straight portions 11 extend in planes intersecting the axes of the said screws at approximately a right angle, and they are arranged to simultaneously come into engagement with the matrix while the latter stands directly over the proper throat channel 9. This prevents the feed screws from imparting lateral motion to the matrices after they have been released from the distributing bar and while they are beginning their downward movements into the respective throat channels.

At the lower extremity of each throat channel 9 (see particularly Figs. 1, 6 and 7) is a matrix switch, shown as in the form of a thin switch plate 12 that is secured to the lower end of an upright oscillatory stem 13 that is suitably mounted, as shown, in an angle plate 14. The angle plate 14, as illustrated, is rigidly secured to the distributing bar 1 by brackets 15 and 16. The oscillatory stem 13 is provided with a short radially projecting arm 17 that is embraced by the pronged end of the depending arm 18 of an oscillatory so-called switch rod 19 mounted in suitable bearings on the upper flange of the angle plate 14. The projecting end of this switch rod 19 is provided with a T-shaped head 20 that stands in a position to engage with notched portions $z^2$ of the matrices $z$. The notches $z^2$ in one of the fonts of matrices of a given letter or character, say, for instance, the lower case e matrices, are located higher up than in the other font of such matrices. With this arrangement it follows that the depending prong of the T-head 20 of the switch rod 19 will be engaged by the lower extremity of the slot $z^2$ of one of the duplex matrices and rocked in one direction, and the coöperating switch plate 12 will be oscillated in one direction, and the upper extremity of the notch $z^2$ of the next matrix of the same character but different font will engage the upper prong of said T-head 20, and the said switch plate 12 will be oscillated in the other direction. In this way, by the successive matrices bearing the same character, but of differing font, the corresponding switch plate 12 will be moved so as to direct the said matrices into the two magazine channels 8 assigned for the reception thereof, and for coöperation with the throat channel 9 into which the matrices are dropped from the distributing bar 1.

Figure 8:
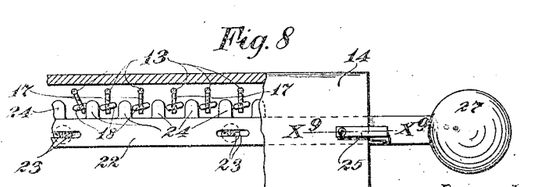
Fig. 8 is a detail, partly in plan and partly in section, on the line $x^8 x^8$ of Fig. 1, some parts being broken away.
Figure 9:
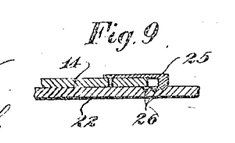
Fig. 9 is a detail in section on the line $x^9 x^9$ of Fig. 8.

By reference to Figs. 1 and 3 it will be noted that the bracket 15 is connected to the bracket 16 by a slot and screw connection 21, so that when desired the angle plate 14 may be moved laterally away from the distributing bar 1 and thereby carry the heads 20 into inoperative positions, to-wit, into positions where they will not be engaged by the matrices. For setting the switch plates 12 simultaneously in either of their two positions, there is provided a so-called "switch bar", shown as in the form of an angle bar 22 (see Figs. 1, 8 and 9) which is mounted for endwise sliding movement on the under surface of the upper flange of the angle plate 14, by slot and screw connections 23. The depending flange of this angle bar 22 is provided with projecting teeth 24 that embrace the depending ends 18 of the switch rod 19. Said bar, as shown, is adapted to be held in either of three positions by means of a latch 25 secured to the upper flange of the angle plate 14, and the beveled nose of which is adapted to be engaged with any one of three depressions 26 formed in said bar 22. At one end, the bar 22 is shown as provided with a knob 27 that affords a convenient hand piece by means of which said bar 22 may be moved endwise. When the said bar is set in its intermediate position, shown in Fig. 8, it does not interfere with the automatic action of the switch mechanism. When it is moved toward the right with respect to Fig. 8, it will simultaneously set all of the switch plates 12 in position toward the right, and when it is moved to its extreme position toward the left, it will simultaneously set all of the said switch plates in position toward the left. When the said bar 22 is thus moved into either of its extreme positions, the heads 20 of the switch rods should be adjusted into an inoperative position, by a movement of the bracket 15 on the bracket 16, as already described. In practice, of course, the angle plate 14 will be supported from the distributing bar 1 by means of two or more sets of the said brackets 15 and 16, or other suitable devices.

Figures 10, 11, 13, 14, 15:
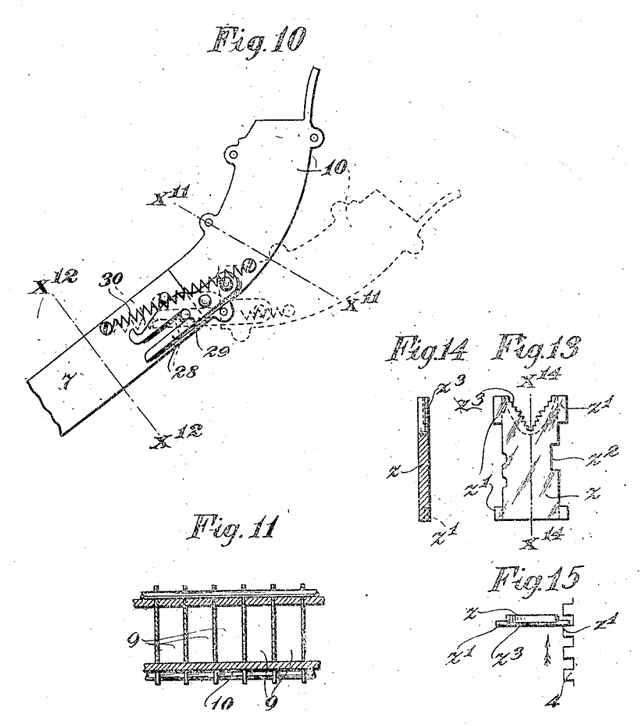
Fig. 10 is a detail in right side elevation showing the novel means for hinging the magazine throat or entrance to the magazine.
Fig. 11 is a section taken on the line $x^{11} x^{11}$ of Fig. 10.
Fig. 13 is an elevation showing in detail one of the matrices.
Fig. 14 is a vertical section taken on the line $x^{14} x^{14}$ of Fig. 13.
Fig. 15 is a plan view of the said matrix.
Figure 12:
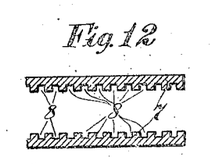
Fig. 12 is a section taken on the line $x^{12} x^{12}$ of Fig. 10.

The partitions in the magazine throat or entrance 10 are rigid with the body thereof, but the entire throat piece is pivotally connected to the receiving end of the magazine 7, as best shown in Fig. 10, by forked bearings 28 on said magazine that detachably and pivotally engage pins or trunnions 29 on said magazine. Coiled springs 30 are attached to the magazine and to the magazine throat at such points that they are adapted to be moved from one side to another of a dead center by pivotal movements of said magazine throat. These springs, therefore, serve to hold the magazine throat either in closed or open positions, as indicated by full and dotted lines in Fig. 10. In the drawings, the said parts 28, 29 and 30 are only shown at one side of the magazine, but in practice they are applied to both sides thereof. The pronged bearings 28 permit the magazine throat to be entirely separated from the magazine. This separation also requires the detachment of the springs 30 either from the magazine or from the magazine throat.

The delivery end of the magazine is supported in the usual or any suitable way, and as shown is supported by a bearing bracket 31, the upper end of which is recessed and provided with a rigidly secured guide block 32, portions of which project through the bottom of the magazine 7.

Working through suitable longitudinally spaced passages in the bottom of the magazine and in the guide block 32 are coöperating pairs of endwise movable escapement pawls 33. There is one pair of these escapement pawls 33 for each pair of magazine channels, and the said pawls are of such width that each is adapted to engage transversely alined matrices in the two coöperating channels. For each pair of escapement pawls 33 there is an intermediately pivoted lever or so-called rocker 34. These rockers 34 are pivotally supported on a shaft 35, which, in turn, is suitably supported by the recessed head of the bracket 31. Said rockers 34 have depending arms 36 and rearwardly projecting arms or lugs 37. The arms 37 are normally engaged by a vertically movable key controlled escapement bar 38, preferably of the usual construction. Normally, this escapement bar 38 holds the rocker, and hence the escapement pawls 33, in the positions shown in Fig. 19. Springs 39 anchored to the bearing bracket 31 press against the arms 36 and tend to move the rockers in a direction to throw the rear pawls 33 upward and the forward pawls 33 downward.

With the escapement mechanism just described, it is evident that under each reciprocating movement of the escapement bar 38, the escapement pawls would tend to simultaneously release the lowermost matrices in the two coöperating channels. To prevent this I provide a so-called matrix selector, which is shown in the form of a bar 40 connected to the upper portion of the delivery end of the magazine 7 by slot and screw connections 41 (see Figs. 19, 20 and 21). This selector or selecting bar 40 is provided with projecting stop lugs or teeth 42, in number equal to the number of pairs of duplicate magazine channels, and so spaced that in either of the two positions of the said bar they will project in front of one of each of the duplicate channels. For instance, in one extreme position, the said selector will close or prevent the escape of matrices from the right hand members of the duplicate magazine channels, and in the other extreme position will prevent the escape of matrices from the left hand members of the said duplicate magazine channels.

Figures 19, 20, 21, 22:
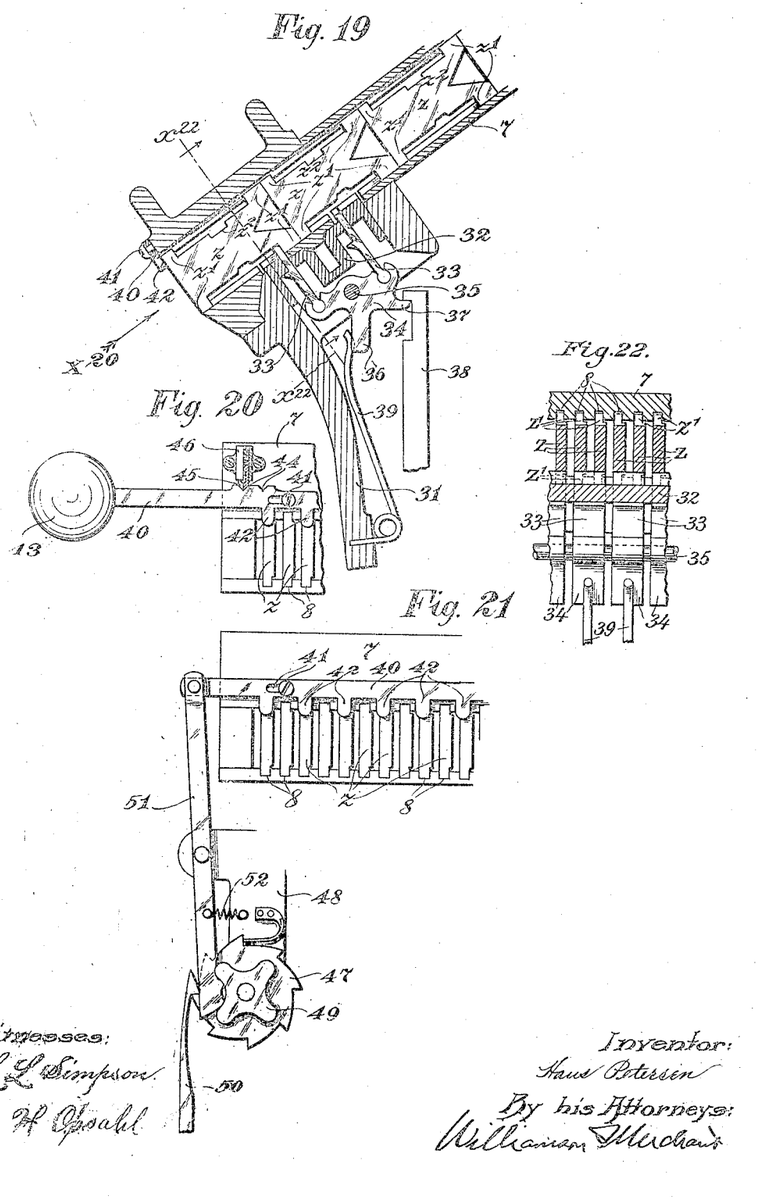
Fig. 19 is a section taken on the same line as Fig. 1, but showing the delivery end of the magazine and coöperating escapement of novel construction.
Fig. 20 is a detail view, with parts broken away, looking at the delivery end of the magazine in the direction of the arrow marked $x^{20}$ on Fig. 19.
Fig. 21 is a view corresponding to Fig. 20, but illustrating a modified construction.
Fig. 22 is a fragmentary detail in transverse section, taken on the line $x^{22} x^{22}$ of Fig. 19.

The matrix selector shown in detail in Fig. 20 is arranged to be operated by hand, while the selector shown in Fig. 21 is arranged to be automatically actuated. In Fig. 20 the selecting bar 40 is shown as provided with a knob 43 which serves as a hand piece, by means of which the bar may be moved endwise, and the said bar is also shown as provided with two notches 44, one or the other of which is always engaged by a spring pressed bevel-nosed latch 45, shown as mounted in a casing 46 secured to the delivery end of the magazine 7. This hand operated selector shown in Fig. 20 is especially adapted for use where the same letter matrices of different face or style are placed in the members of the twin or duplicate magazine channels. In this arrangement, when matrices having letters of one style or face of type are required, the selecting bar 40 is moved into one extreme position, and when matrices having letters of the other style or face are required, said selecting bar is moved into its other position.

The selector actuating devices shown in Fig. 21 is arranged to automatically move the selecting bar 40 from one extreme position to the other, so that it will in alternate or repeating order permit the escape of matrices from the duplicate channels of the magazine. This device is, therefore, especially adapted for use when matrices bearing the frequently used letters or characters of the same face, style and character are placed in the duplicate or twin channels of the magazine.

Figure 4:
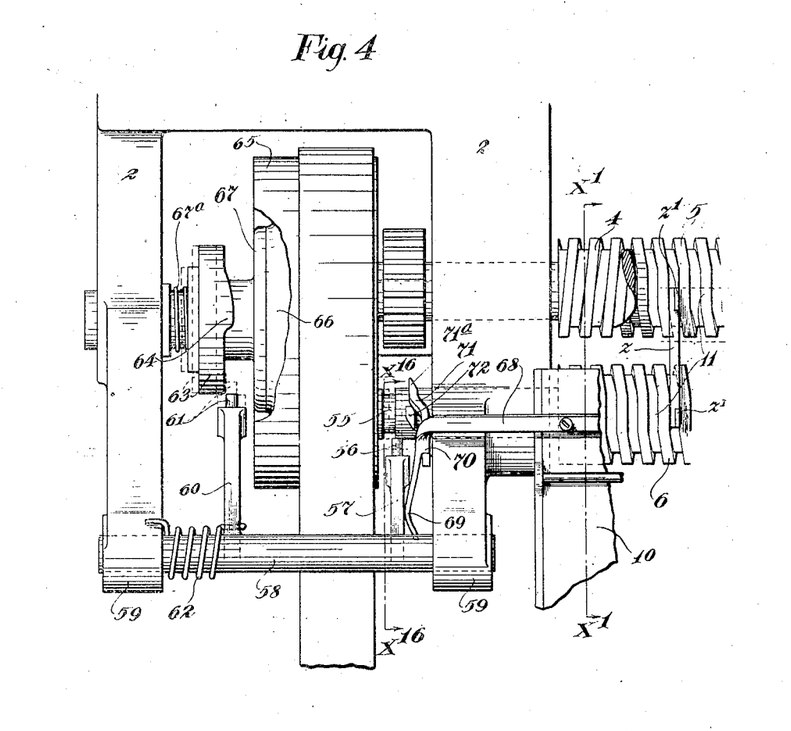
Fig. 4 is a rear elevation, with some parts broken away and some parts removed, showing the extreme delivery ends of the matrix distributing screws and coöperating mechanism.
Figure 5:
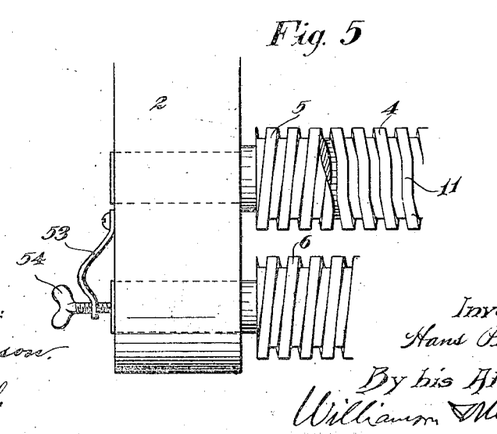
Fig. 5 is a fragmentary view in front elevation, showing the receiving ends of the matrix distributing screws and support therefor.
Figure 6:
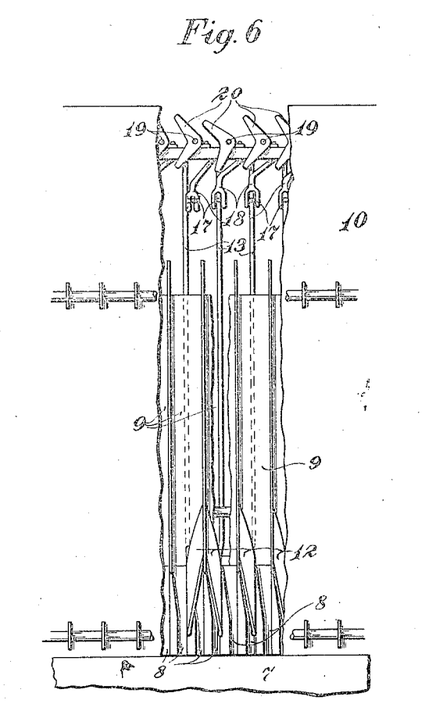
Fig. 6 is a fragmentary view in rear elevation, with some parts broken away, looking at the mechanism which is in the close vicinity of the arrow marked $x^6$ on Fig. 1.
Figure 7:
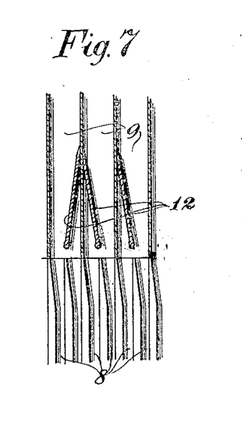
Fig. 7 is a detail in section taken on the line $x^7 x^7$ of Fig. 1.
Figure 16:
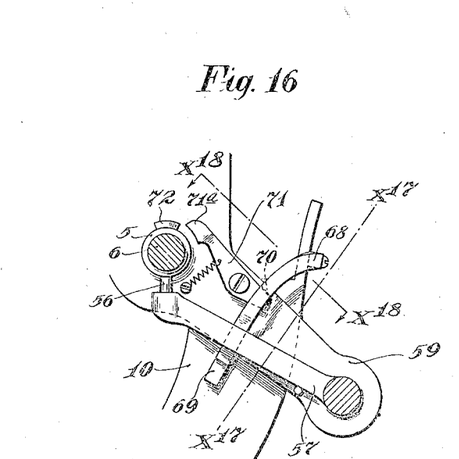
Fig. 16 is a detail in vertical section taken on the line $x^{16} x^{16}$ of Fig. 4.

The automatic selector actuating device shown in Fig. 21 comprises a ratchet wheel 47 which is rotatively mounted on a suitable support 48 and carries with it a cam wheel or tappet 49. The cam wheel 49 has one-half as many prongs or projections as the ratchet wheel 47 has teeth. Said ratchet wheel is given an intermediate rotary movement by means of a reciprocatory pawl 50 which may be given movement by any suitable vibratory or movable part of the machine, such, for instance, as the assembler elevator which, in the most common form of the machine, is raised and lowered for each line. The cam wheel 49 operates upon the lower end of a lever 51 that is intermediately pivoted to the support 48, and its upper end is pivotally connected to the projecting end of the selector bar 40 and is connected to the bearing 48 by a spring 52. In machines of this character it sometimes happens that the matrices, while still subject to the distributing screws, are dropped into contact with the upper extremities of the partitions in the magazine throat or entrance, and when this takes place it is desirable that the distributing screws be thrown out of action to prevent breaking of the parts. Another feature of this invention consists in the novel arrangement for accomplishing this result, and this mechanism is illustrated in Figs. 4, 5, 16, 17 and 18. The said mechanism described is as follows: One of the distributing screws, to-wit, as shown, the lower distributing screw 6, is mounted for limited endwise movement against the tension of the spring 53 (see Fig. 5). As shown, the spring 53 is secured to a projection of the frame 2 and is provided at its free end with an adjusting screw 54 that directly engages the reduced end or journal of the screw 6. When the matrix, still subject to the action of the distributing screws, catches the upper extremity of a partition of the magazine throat or entrance 10, the lower screw 6 will be given a slight endwise movement in a direction from the left toward the right with respect to Fig. 4, and from the right toward the left with respect to Fig. 5. In the reduced left hand end or journal of the screw 6 (directions being taken with respect to Fig. 4) is an annular groove 55 that is adapted to be engaged by a stud-like projection 56 of an arm 57, which arm is secured to a rock shaft 58 journaled in projections 59 of the frame 2. The rock shaft 58 is provided with another arm 60 which has a stud-like projection 61. A torsional spring 62 on the rock shaft 58 reacts against the arm 60 thereof and against one of the bearings 59, exerting a force that normally holds the arm projection 56 against the reduced portion of the screw 6 adjacent to its groove 55, as shown in Figs. 4 and 16. Running in close proximity to the arm projection 61 is a profile cam 63 having a laterally projecting cam portion 64. This cam 63, as shown, is driven from a pulley 65, preferably through a spring closed friction clutch 66—67, which clutch members are carried, respectively, by said pulley and the said cam wheel. With this arrangement, when the feed screw 6 is moved endwise, as just above described, the projecting stud 56 of the arm 57 falls into the groove 55 of the said screw 6, and the stud 61 of the arm 60 is then moved into a position for engagement with the projection 64 of the cam 63, thereby causing the clutch members 66 and 67 to be separated and thus stop the feed screws 4, 5 and 6.

Figure 17:
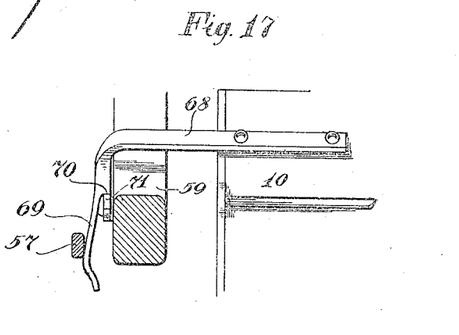
Fig. 17 is a transverse section taken on the line $x^{17} x^{17}$ of Fig. 16.
Figure 18:
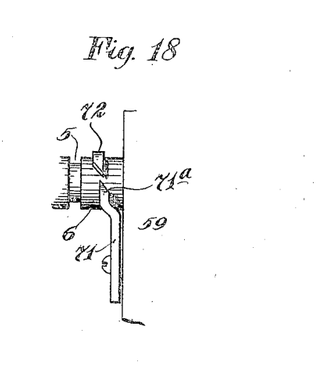
Fig. 18 is a detail in plan showing the parts located immediately below the line marked $x^{18} x^{18}$ on Fig. 16, some parts being removed.

Secured to the pivotally mounted magazine throat or entrance 10 is a resetting device, shown as in the form of a bar 68 that is provided with a depending cam finger 69 and shoulders 70, best shown in Figs. 4, 16 and 17. This cam finger 69 will be given an upward movement when the magazine throat 10 is oscillated from the position by full lines in Fig. 10 into the position shown by dotted lines in said view, and will, of course, be given downward movement under reverse movement of said magazine throat. This cam finger 69 is adapted to spring laterally and it is so formed that under downward movement it will first engage the arm 57 and press the same downward, and will then cam itself to one side of said arm and move into position below the said arm, as shown in Fig. 17. When said arm 57 is pressed downward, it is forced out of the groove 55, thereby allowing the spring 53 to return the feed screw 6 to its normal position shown in Fig. 4. The downward movement of said arm 57 also moves the arm 60 downward, thereby carrying the stud 61 out of engagement with the cam projection 64, thus permitting the clutch 66—67 to again become operative under the tension of its closing spring 67$^a$. When the cam finger 69 is moved below the arm 57 it permits the said arm 57 and the arm 60 to be again set in normal positions shown in Fig. 4, under the action of the spring 62. It is also advisable to provide means whereby the feed screws will be thrown out of action whenever the magazine throat 10 is moved pivotally from its operative position. For this purpose I provide a spring pressed cam dog 71 which, as shown, is pivoted to one of the bearings 59 and is normally held in an inoperative position by the shoulder 70 of the so-called restoring bar 68. When the magazine throat is moved pivotally from its operative position, the shoulder 70 is raised, thereby permitting the beveled end 71ª of the said dog 70 to come into engagement with a cam lug 72 on the reduced end of the feed screw 6. When this cam lug 72 engages the cam end 71 it moves the screw 6 endwise and permits the stud 56 of the arm 57 to fall into the groove 55 in the same manner as when the said screw 6 is moved endwise as above described by engagement of a matrix with one of the partitions of the magazine throat, and the clutch members are separated and the feed screws 4, 5 and 6 stopped, as already clearly described. It is also important to note that the screw engaged faces of the matrix lips $z^2$ are flush with the outer faces or edges of the distributing teeth $z^3$ of the said matrices (see Figs. 13, 14 and 15). This is important because, regardless of the thickness of the matrix lips, the matrix will always drop from the distributing bar while in engagement with the straight portions of the screws.

What I claim is:

1. In a linotype machine, the combination with a matrix magazine having laterally spaced duplicate channels and a channeled throat through which the matrices pass from the distributing mechanism to said magazine, of laterally movable switch plates in said throat, arranged to direct the matrices from the channels of said throat into either one of the two coöperating magazine channels, substantially as described.

2. In a linotype machine, the combination with a matrix magazine having laterally spaced duplicate channels and a channeled throat through which the matrices pass from the distributing mechanism to said magazine, of pivotally mounted switch plates in the channels of said throat for directing the matrices into either of the two coöperating magazine channels, and a switch plate actuating device, including a rocking head, arranged to be acted upon by the matrices while the latter are subject to the distributing mechanism, substantially as described.

3. In a linotype machine, the combination with a matrix magazine having laterally spaced duplicated channels and a channeled throat through which the matrices pass from the distributing mechanism to said magazine, of laterally movable switch plates in the channels of said throat arranged to direct the matrices from the channels of said throat into either of the two coöperating magazine channels, and a device operative to simultaneously set all of said switch plates in either of their two positions, substantially as described.

4. In a linotype machine, the combination with a matrix magazine having laterally spaced duplicated channels and a channeled throat through which the matrices pass from the distributing mechanism to said magazine, of laterally movable switch plates in the channels of said throat arranged to direct the matrices from the channels of said throat into either of the two coöperating magazine channels, common escapement devices for the members of the duplicate magazine channels, and a selecting device for determining which of the two matrices released by the coöperating escapement device shall be discharged from said duplicating channels, substantially as described.

5. In a linotype machine, the combination with a channeled matrix magazine and coöperating escapement devices, of a selecting device arranged to be operated independently of said escapement devices and to be set at will and for any desired length of time in one position to permit the discharge of matrices from certain of said channels of said magazine, and to be set at will in another position to permit the discharge of matrices from other channels of said magazine, substantially as described.

6. In a linotype machine, the combination with coöperating matrix distributing screws and means for driving the same involving a clutch, one of which screws is mounted for endwise movement, of clutch releasing mechanism operated by an endwise movement of the said endwise movable screw, substantially as described.

7. In a linotype machine, the combination with coöperating distributing screws and means for driving the same involving a clutch, one of which screws is yieldingly mounted for endwise movement, a clutch releasing device arranged to be carried by an endwise movement of the said endwise movable screw, a matrix magazine and movable magazine throat receiving the matrices from said screws and delivering the same into said magazine, and means whereby a movement of said magazine throat will again render said clutch operative, substantially as described.

8. In a linotype machine, the combination with coöperating distributing screws and means for driving the same comprising a clutch, one of which screws is yieldingly mounted for endwise movement, a clutch releasing connection arranged to be operated by an endwise movement of said endwise movable screw, a matrix magazine and movable magazine throat, and means whereby a movement of said magazine throat away from its normal position will operate through said clutch releasing connection, to render said clutch inoperative and hence stop said distributing screws, substantially as described.

9. In a linotype machine, coöperating matrix distributing screws having straight or retarded thread portions, substantially as and for the purposes set forth.

10. In a linotype machine, the combination with a magazine and magazine throat, both having channels, the latter having laterally spaced partitions, of coöperating distributing screws located above the partitions of said magazine throat and provided with retarded thread portions, substantially as and for the purposes set forth.

11. In a linotype machine, the combination with coöperating distributing screws having straight or retarded thread portions, of matrices having distributing teeth and projecting guide lips that lie flush or in the same plane on that side of the matrix on which said lips are subject to the action of said distributing screws, substantially as described.

12. In a linotype machine, the combination with a magazine, of a magazine throat, of pronged bearing brackets applied to one of said parts, and coöperating studs or projections on the other of said parts affording a detachably pivotal connection between said two parts, substantially as described.

In testimony whereof I affix my signature in presence of two witnesses.

HANS PETERSEN.

Witnesses:
  H. D. KILGORE,
  P. D. MERCHANT.